2,993,072
PROCESS FOR OBTAINING CARBOXYLIC ACIDS FROM ORGANIC PEROXIDES AND CARBON MONOXIDE
Giam Paolo Chiusoli, Novara, and Francesco Minisci, Milan, Italy, assignors to Montecatini, Societa Generale per l'Industria Mineraria e Chimica, Milan, Italy, a corporation of Italy
No Drawing. Filed June 14, 1957, Ser. No. 665,656
Claims priority, application Italy June 15, 1956
10 Claims. (Cl. 260—537)

This invention relates to a process for obtaining carboxylic acids from organic peroxides and carbon monoxide.

It is known that, upon oxidizing various organic compounds by means of oxidants such as air or hydrogen peroxide, peroxides are obtained which can be decomposed in the presence of ferrous sulphate or other reducing agents used in stoichiometric or catalytic amounts.

For example, when cyclohexanone is oxidized with hydrogen peroxide or air, peroxides of variable compositions are recovered which can be easily decomposed into radicals, which in turn dimerize to form dodecandioic acid.

We have now found that carboxylic acids can be obtained if the decomposition of aliphatic, alicylic or aralkylic peroxides, including those having peroxidized tertiary carbon atoms, ketone- or hydrocarbon-peroxides or hydroperoxides, is carried out under carbon monoxide pressure and in the presence of agents employed in the redox systems.

The compounds decomposed in the examples below are hydroperoxides in which the peroxidized carbon atom is not bound to any hydrogen atom. The peroxidized tertiary carbon atom is in the linkage

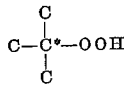

as exemplified by tert. butyl hydroperoxide. The other type has the linkage

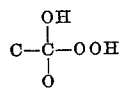

being hydroperoxides of ketones, i.e. oxy-hydroperoxides, as exemplified by cyclohexanone peroxide.

It is, therefore, the object of the present invention to produce carboxylic acids from aliphatic, alicyclic or aralkylic peroxides or hydroperoxides having a peroxidized tertiary carbon atom or a hydroperoxidized carbon atom, by reacting such peroxides or hydroperoxides with carbon monoxide, in the presence of agents capable of promoting decomposition of peroxides into radicals.

This and other objects and advantages of the invention will appear more clearly from the herein following examples and the appended claims.

The above-described synthesis represents a general method for introducing the carbon-monoxide group into organic molecules of the afore-mentioned type. It is particularly useful since it occurs under very mild conditions such as at or even below room temperature. Moreover, it permits the preparation of organic acids which are difficult to obtain by means of other methods, such as, for example, the various isomeric alkyl-pimelic acids.

The reaction can be carried out in the presence of materials at any stoichiometric ratio, which cause the formation of radicals that react with carbon monoxide. The radicals are formed according to the general formula:

wherein R can be hydrogen or an organic residue. The symbol e signifies an electron.

Among the aforementioned materials, typical agents of the redox systems, for example, ferrous sulphate, sodium bisulphite, and heavy metals with different valences such as iron, cobalt and manganese, were found to be particularly useful.

The course of the reaction comprises essentially a first stage of decomposition of said types of peroxides into radicals, such as, for example, in case of tert. butyl alcohol hydroperoxide:

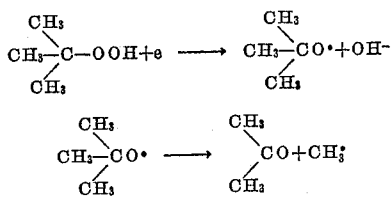

or in case of cyclohexanone peroxide:

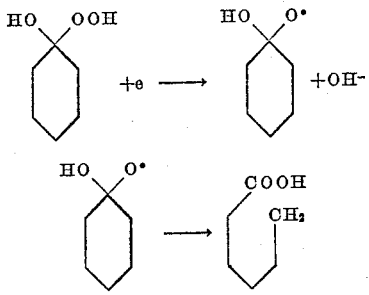

and a second stage wherein the radicals thus formed react with carbon monoxide, initiating a series of reactions:

(A) 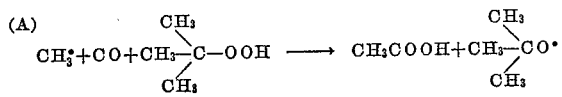

or (B) 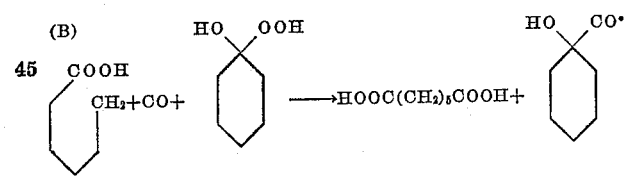

In addition to the main reaction, secondary reactions, most of them due to the reduction of the radical formed, occur to a greater or lesser extent:

(A') 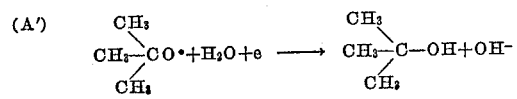

(B') 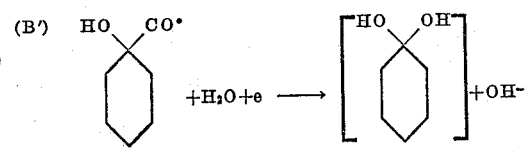

(B″) 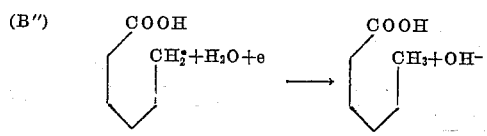

These secondary reactions may also be caused by a reaction of these radicals without intervention of carbon monoxide.

It should be noted that aliphatic chains in orthoposition with respect to the peroxidized carbon atom do not prevent the carbon-monoxide action but they represent a hindrance to the dimerization reaction of the radical deriving from the decomposition of the peroxide.

In fact, 2-methylpimelic acid is obtained from 2-methyl cyclohexanone.

The reaction occurs at temperatures between —50° and +100° C., under carbon monoxide pressures between atmospheric pressure and 500 atm. It is carried out in liquid phase, in the presence of solvents (such as methyl alcohol, water and urea, acetone, benzene, and in the presence of emulsifiers such as sulphonated alcohols, soaps, etc. by contacting the peroxide with the agent which promotes radical formation.

The operation can either be carried out in an autoclave or, if a continuous process is desired, in a reaction column in which carbon monoxide is circulated.

The following examples are reported to illustrate the present invention but not to restrict the scope thereof in any manner.

*Example 1*

10 g. of cyclohexanone peroxide, predominantly consisting of 1-hydroxy-1-hydroperoxy-cyclohexaneperoxide, 50 g. of urea and 100 g. of water are placed in an autoclave provided with a stirrer. Carbon monoxide at 300 atm. pressure and an aqueous solution of 20 g. of $$FeSO_4 \cdot 7H_2O$$

are gradually injected. From the reaction product, extracted with ether, about 5.5 g. pimelic acid, M.P. 102°–103° C., are recovered.

*Example 2*

Cyclohexanone peroxide is dissolved in methyl alcohol and placed in an autoclave. An aqueous solution of ferrous sulphate is injected at room temperature into the autoclave after the latter has been charged with CO of 50 atm. pressure. After distilling off the methanol, the reaction mixture is treated with hot alkalies, filtered and re-acidified; by means of extraction with ether, pimelic acid is recovered. From 6 g. peroxide, 3 g. pimelic acid are obtained.

*Example 3*

Cyclohexanone peroxide in water and urea is heated to 50° C. under a CO pressure of 10 atm., while stirring. An aqueous solution containing 20 g. of $FeSO_4 \cdot 7H_2O$ is injected. This mixture is acidified and extracted with ether. Pimelic acid is recovered.

*Example 4*

24 g. cyclopentanol are oxidized for 70 hours with oxygen at 45° C. in the presence of ultraviolet light. A solution containing about 8% peroxide is obtained. 100 g. of oxygen-free methyl alcohol are added and the solution is introduced into an autoclave provided with a stirrer under a CO pressure of 100 atm.

A solution of 5 g. ferrous sulphate in water is then injected at 20° C. by means of a pump. The reaction product is treated with hot alkali and filtered; upon acidification, about 0.3 g. of adipic acid are obtained.

*Example 5*

2-methyl cyclohexanone peroxide is prepared by contacting, as described in the literature, 2-methyl cyclohexanone with 90% hydrogen peroxide. In the alternative, we discovered that 30% hydrogen peroxide may be employed when operating in a dioxane solution. 20 g. of 2-methyl cyclohexanone, 20 cc. of dioxane and 17 cc. of 30% hydrogen peroxide are mixed at 20° C. The term "30% hydrogen peroxide" is employed in its currently used sense, meaning 30% aqueous hydrogen peroxide. A slight heating to 32° C. is observed. After standing for ½ hour, 0.5 cc. of 1/1 HCl is added. Shortly afterwards, an oil precipitates which is decanted.

This oil contains 70% peroxide. It is suspended in an aqueous urea solution and treated, in the presence of 100 atm. CO, in an oscillating autoclave with 60 g. of ferrous sulphate in form of a saturated solution, introduced within a period of one hour. The reaction mixture is treated with hot alkali and filtered. Upon acidification, a product having an acid number of 102 is obtained. After distillation at 210° C. under a pressure of 10 mm. Hg, 7 g. of 2-methylpimelic acid, M.P. 50–53° C., are obtained. Recrystallization from water increases the melting point to 58° C. The following processes, carried out similarly to those described above, are intended primarily to illustrate the course the reaction takes in the case of the reaction designated (A) above.

*Example 6*

Tert.-butyl alcohol hydroperoxide in aqueous solution is treated, under a CO pressure of 100 atm., with a ferrous sulphate solution while stirring. Besides acetone and tert.-butyl alcohol, a mixture of acids, mainly consisting of acetic and propionic acids, is obtained.

*Example 7*

Upon treating cumene hydroperoxide in the manner of the foregoing example, it decomposes into acetophenone and cumyl alcohol and yields a mixture of primarily acetic and propionic acids.

We claim:

1. A process of making pimelic acid, comprising reacting cyclohexanone peroxide with carbon monoxide at from 1 to 50 atmospheres pressure, and at a temperature from —50° C. to +100° C. in the presence of ferrous sulfate.

2. The process of making adipic acid, comprising reacting cyclopentanol peroxide with carbon monoxide at from 1 to 500 atmospheres pressure, and at a temperature from —50° C. to +100° C. in the presence of ferrous sulfate.

3. A process of making 2-methylpimelic acid, comprising reacting 2-methyl cyclohexanone peroxide with carbon monoxide at from 1 to 500 atmospheres pressure, and at a temperature from —50° C. to +100° C. in the presence of ferrous sulfate.

4. A process of making acetone and aliphatic acids, comprising reacting tertiary butyl alcohol hydroperoxide with carbon monoxide at from 1 to 500 atmospheres pressure, and at a temperature from —50° C. to +100° C. in the presence of ferrous sulfate.

5. The process of making acetophenone and aliphatic acids, comprising reacting cumene hydroperoxide with carbon monoxide at from 1 to 500 atmospheres pressure, and at a temperature from —50° C. to +100° C. in the presence of ferrous sulfate.

6. The process for obtaining carboxylic acids comprising reacting a peroxide compound of the group consisting of those of the formula

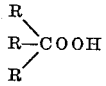

in which the R groups are lower alkyl radicals; and cyclohexanone peroxide, and lower alkyl substituted cyclohexanone peroxide, said reacting being with carbon monoxide at a pressure ranging from 1 to 500 atmospheres and at a temperature from —50° C. to +100° C. in the presence of ferrous sulfate.

7. A process for obtaining a di-carboxylic acid, comprising reacting a compound of the group consisting of cyclohexanone peroxide and lower alkyl substituted cyclohexanone peroxide with carbon monoxide at a pressure ranging from 1 to 500 atmospheres and at a temperature from −50° C. to +100° C. in the presence of ferrous sulfate.

8. The process of claim 1, carried out in the presence of methyl alcohol and water.

9. The process of claim 1, carried out in water in the presence of urea.

10. The process of claim 2, carried out in the presence of methyl alcohol and water.

References Cited in the file of this patent
UNITED STATES PATENTS

| | | |
|---|---|---|
| 2,298,405 | Milas | Oct. 13, 1942 |
| 2,601,223 | Roedel | June 24, 1952 |
| 2,687,432 | Coffman | Oct. 8, 1952 |
| 2,700,057 | Punderson | Jan. 18, 1955 |
| 2,828,338 | Lavigne | Mar. 25, 1958 |

OTHER REFERENCES

Tobolsky et al.: "Organic Peroxides," 1954, pages 1–51.